United States Patent [19]

Takehara et al.

[11] Patent Number: 5,654,883
[45] Date of Patent: Aug. 5, 1997

[54] POWER CONTROL APPARATUS AND METHOD AND POWER GENERATING SYSTEM USING THEM

[75] Inventors: Nobuyoshi Takehara, Soraku-gun; Seiji Kurokami, Tsuzuki-gun, both of Japan

[73] Assignee: Canon Kabushiki Kaisha, Tokyo, Japan

[21] Appl. No.: 255,929

[22] Filed: Jun. 7, 1994

[30] Foreign Application Priority Data

Jun. 11, 1993 [JP] Japan ............................. 5-140682

[51] Int. Cl.$^6$ ........................................... H02M 7/54
[52] U.S. Cl. ........................ 363/79; 323/906; 363/95
[58] Field of Search .................... 363/95, 80, 79; 323/906, 299

[56] References Cited

U.S. PATENT DOCUMENTS

| | | | |
|---|---|---|---|
| 4,390,940 | 6/1983 | Corbefin et al. | 363/132 |
| 4,649,334 | 3/1987 | Nakajma | 323/299 |
| 4,899,269 | 2/1990 | Rouzies | 363/41 |
| 4,916,382 | 4/1990 | Kent | 323/299 |
| 5,235,266 | 8/1993 | Schaffrin | 323/906 |
| 5,375,429 | 12/1994 | Tokizaki et al. | 62/235.1 |

FOREIGN PATENT DOCUMENTS

| | | |
|---|---|---|
| 0140149 | 5/1985 | European Pat. Off. . |
| 0326489 | 8/1989 | European Pat. Off. . |
| 61-2206 | 1/1986 | Japan . |
| 62-42213 | 2/1987 | Japan . |
| 62-85312 | 4/1987 | Japan . |
| 63-57807 | 11/1988 | Japan . |
| 8700312 | 1/1987 | WIPO . |

OTHER PUBLICATIONS

K. Siri et al. "Maximum Power Tracking in Parallel Connected Converters" IEEE Transactions on Aerospace and Electronic Systems, 29 Jul. 1993, No. 3, New York, U.S., pp. 935–945.

G. Yu et al., "Application of Instanteous Sinusoidal Current Tracking Control Inverter to Photovoltaic System", Technical Digest of Int. PVSEC-5, Kyoto, Japan, 1990, pp. 661–664.

*Primary Examiner*—Peter S. Wong
*Assistant Examiner*—Shawn Riley
*Attorney, Agent, or Firm*—Fitzpatrick, Cella, Harper & Scinto

[57] ABSTRACT

A power control system for obtaining the maximum electric power from a battery power source. The system functions to vary an output voltage of the battery power source to obtain (m) power values from at least (m) voltage signals from a voltage detector and at least (m) current signals from a current detector which were sampled at desired intervals. A function is used which approximates the relations between the (m) voltage values and (m) power values. A voltage is calculated at which a power is set to a maximum value from the function and the (m) voltage and power values. The power is set at such a voltage into an output power set value and the output power of the battery power source is controlled.

5 Claims, 3 Drawing Sheets

POWER CONTROL APPARATUS AND METHOD AND POWER GENERATING SYSTEM USING THEM

BACKGROUND OF THE INVENTION

1. Field of the Invention

The invention relates to a power control apparatus and method for transferring electric power from a power source to a work producing load and to a power generation system using such apparatus and method. The invention also relates to a power control apparatus and method for efficiently extracting electric power from a power source and to a power generation system using such apparatus and method.

2. Related Background Art

Since concern for the earth's environment is increasing, a power generation system using wind power generation, a solar battery, or the like which provides a safe and clean energy source is desirable. However, the power output of a solar battery or the like fluctuates extremely depending on various parameters such as insolation amount, atmospheric temperature, operation point voltage, and the like. As a result adjustments are constantly required to ensure that the electrical power supplied by the solar battery to the load produces maximum power transfer. For this purpose, various kinds of apparatuses and methods have conventionally been proposed. For example, in the case of the solar battery, a method whereby meteorological conditions which momently change are used and the operation voltage is determined by using a monitor comprising an auxiliary solar battery or a sensor which is provided separately from a solar battery array and is used to detect the ambient light or a temperature. This method called an indirect method has been disclosed in JP-B-61-2206. On the other hand, a method whereby such an auxiliary sensor is not used is one where an operation point voltage or current of a solar battery array is finely fluctuated and the electric power fluctuation at that time is checked so that an operation voltage can be determined. This method called a direct method has also been disclosed in JP-B-63-57807. Hitherto, a power converter or the like has been controlled by extracting the maximum output from the solar battery by using the methods mentioned above.

The above methods, however, have the following problems.

According to the indirect method, it is necessary to use the monitor to detect an insolation amount or the like. A sensor or solar battery must also be provided separately from the solar battery array to accurately determine the relation between the meteorological conditions which were measured by the monitor or the parameters indicative of the meteorological conditions and the operation point voltage and the power of the solar battery array to be controlled. In order to accurately determine such relation, it is necessary to precisely measure them for a long period of time, which is very troublesome. In addition, the area of a solar battery array is generally equal to or larger than a few square meters, while the monitor is much smaller so that the occurrence of a measurement error or the like is possible. For example, in the case of detecting an insolation amount, if the monitor portion is covered by a shadow due to Some circumstances, in spite of the fact that solar light is being irradiated on the entire solar battery array, a judgment of "dark" is made which prevents the correct control function from being performed.

According to the direct method, since an auxiliary monitor is not used, the maximum power point of the solar battery array can always be tracked. According to this method, however, in order to raise the tracking precision, it is necessary to finely check the optimum operation voltage over a wide range. Generally, the operation point voltage required to obtain the maximum power of the solar battery can fluctuate by as much as 10% depending on the meteorological conditions. For example, in case of the solar battery array whose output voltage is equal to about 200V, the optimum operation voltage exists in a range of about 180 to 220 V. Therefore, in order to obtain the optimum operation voltage, the above range must be finely examined. It is, however, difficult to always momentarily scan the whole range. In JP-B-63-57807 or JP-A-62-85312, an inspected range is narrowed by using a voltage differentiated value of electric power or by introducing a mark indicative of the change of direction of an operation point voltage. According to such a method, when the meteorological conditions fluctuate, the fluctuation of the operation point is gradually traced, so that a fluctuation width must be properly determined in consideration of the relation between the tracking precision and the transient response speed. Because the optimum fluctuation value varies depending on the location of installation, the kind of solar battery, or the like, it is difficult to accurately obtain the optimum fluctuation value. Since the above method uses a differentiated value or the like which is very sharp, there is a problem such that it is largely influenced by a measuring system error or a sudden insolation change which causes an excessive response to occur. On the other hand, according to JP-A-62-42213, a fluctuation is introduced to an output of the solar battery, the voltage and current are sampled, and the point at which the maximum electric power is obtained is directly determined. According to such a method, although stability is high as compared with the above described method, in order to raise the tracking precision, it is necessary to finely examine a wide range and the sampling number must be increased accordingly. Both of the tracking precision and the response speed cannot simultaneously be satisfied.

SUMMARY OF THE INVENTION

It is an object of the invention to provide a novel power control apparatus and method which can solve the problems found in the conventional power control devices described above and also to provide a power generation system using such apparatus and method.

According to the invention, the above problems are solved by a power control apparatus including means for converting electric power from a battery power source and supplying to a load; means for detecting an output value of an output voltage and an output current of the battery power source; means for determining a substantially maximum output value of the battery power source; and means for controlling the power converting means in a manner such that the output value of the battery power source is made equal to the value set by the output value determining means. The output value determining means determines the substantially maximum output value by solving for its maximum valve an approximation function. The output value detecting means is constructed by output voltage detecting means and output current detecting means. The output value determining means calculates (m), where m is a positive integer, power values from (m) voltage values which are obtained from the output voltage detecting means and (m) current values which are obtained from the output current detecting means and obtains a numerical value by solving the approximation function using the (m) voltage values and the (m) power values. The approximation functions may include, but are not limited to, a quadratic function, a trigonometric function, an exponential function, or a high-order polynomial function. A preferred number of samples of the voltage and current are equal to m=3.

The above problems are also solved by a power control method including the steps of changing an output voltage of a battery power source and obtaining (m) power values from at least (m) voltage signals from a voltage detecting means which were sampled at desired intervals and from at least (m) current signals from a current detecting means. Calculating a function which approximates the relations between the (m) voltage values and the (m) powers and determining a voltage at which the electric power is equal to a substantially maximum value from that function. The output voltage which is then set equal to the maximum voltage which is then used to control the output power of the battery power source. The function approximates a quadratic function, a trigonometric function, an exponential function, or a high order polynomial function.

According to the control apparatus and method of the present invention, the relation between the output voltage of the battery power source such as a solar battery or the like (hereinafter, also referred to as a solar battery array) and the output power is approximated by a function, thereby obtaining the voltage at which the power is equal to a substantially maximum value. The voltage at which the maximum power is derived can be correctly, quickly, and accurately set by a narrow inspected range or the small sampling number. The maximum power can then be extracted from the solar battery array.

DETAILED DESCRIPTION OF THE PREFERRED EMBODIMENTS

Figure 1:
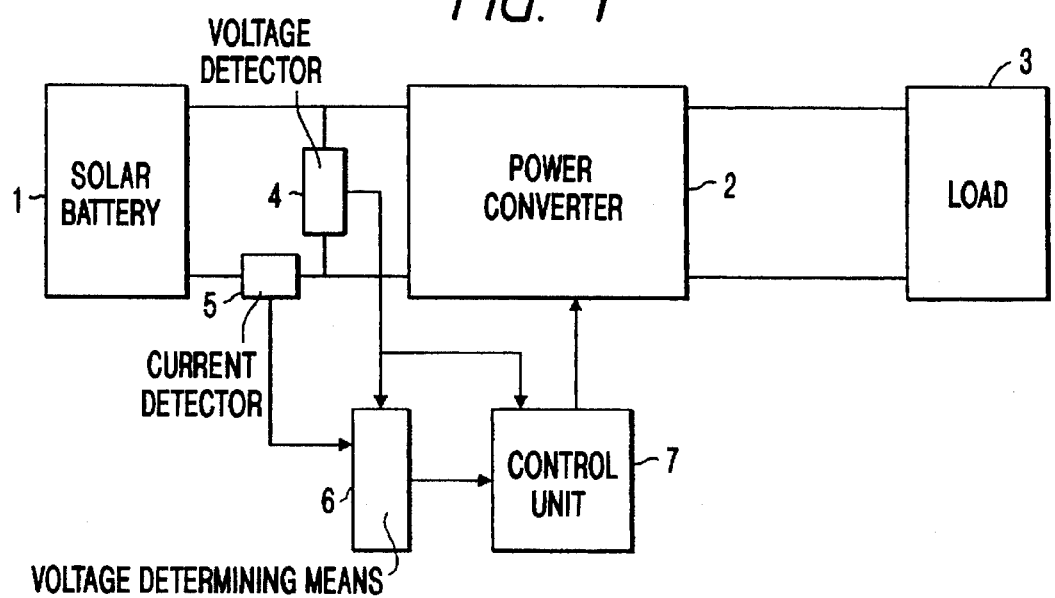
FIG. 1 is an example of a block circuit diagram of a solar light power generation system using a control apparatus of the present invention.
Figure 2:
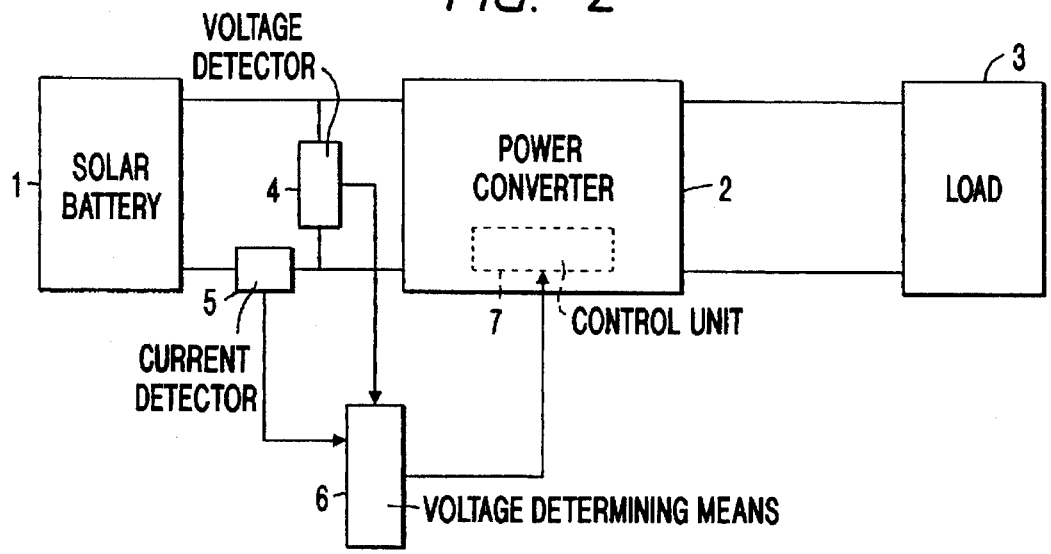
FIG. 2 is another example of a solar light power generation system using the control apparatus of the invention.

FIG. 1 shows an example of a power generation system using a power control method of the invention. A DC output of a solar battery 1 is input to a power converter 2 and supplied to a load 3.

As a solar battery 1, it is possible to use a battery in which a crystalline silicon, non-monocrystalline silicon (amorphous silicon system or the like), compound semiconductor, or the like is used as a photoelectric converting device. Generally, a plurality of solar batteries are combined in series and in parallel so as to form a solar battery array, thereby obtaining desired voltage and current.

As a power converter 2, there is a DC/DC converter using a self-arc-extinguishing type switching device such as a power transistor, power FET, IGBT, or the like, a self-exciting type DC/AC inverter, or the like. A power flow, input/output voltages, an output frequency, and the like of the power converter can be controlled by ON/OFF duty ratios (so called conduction ratios) and frequencies of all gate pulses.

As a load 3, there are various kinds of loads such as electrothermal load, motor load, and the like. In the case of an alternating current, a commercially available AC system can also be used. When a commercially available AC system is used as a load, such a system is called a "system interconnection solar light power generation system". Since the power system is used as the load, there is no limitation in the amount of electric power which can be applied. The control system of the present invention which applies the maximum limit electric power from the solar battery or the like is particularly preferable. Although a secondary battery can be also used as a DC load, in such a case, it is desirable to set a capacitance of the secondary battery to a large enough value to manage the charging state of the battery. In the case where a direct current is used as the load, a DC/DC converter is used as the power converter 2.

An output voltage and an output current of the solar battery 1 are detected by a voltage detecting means 4 and a current detecting means 5, respectively. Their detection signals are input to an output voltage determining means 6 of the solar battery.

The voltage detecting means 4 divides the solar battery output voltage with a resistor network and A/D converters convert the voltage into a digital value, which is provided to the output voltage determining means 6 and a control means 7. In this case, in order to avoid the mixture of noise or the like, it is desirable to insulate an output circuit of the solar battery and a transmission circuit of the detection signal by using a photocoupler or the like which can perfectly perform the insulation between the input and the output. The current detecting means 5 converts the current into voltage by a Hall effect element, a standard resistor, or the like and supplies a detection signal as a digital value to the voltage determining means 6 in a manner similar to the voltage detecting means 4. In the voltage and current detecting means, it is preferable to use A/D converters having a high processing speed and a high precision. Specifically, it is desirable to use an A/D converter having a resolution of 10 bits or more and a sampling frequency of 50 Khz or higher. Such A/D converters can construct a control system having an error of 0.1% or less and a response speed of one second or less.

The output voltage determining means 6 executes an arithmetic operation on the basis of the detection signal and determines an output voltage value and provides the determined output voltage value to the control means 7. The output voltage determining means 6 is realized as a microcomputer for control and can have a CPU, a RAM, a ROM, input/output ports, a numerical value operator, and the like.

The control means 7 of the power converter is called a gate driving circuit and generates a gate pulse by an instantaneous value current comparing method, a sine wave/triangular wave comparing method, or the like. Due to this, the control means 7 controls the conduction ratio of the power converter 2 so that the output voltage of the solar battery coincides with the voltage value determined by the output voltage determining means 6. Although the control means 7 can be constructed by either an analog circuit or a digital circuit, in recent years, most of the control means are constructed by digital circuits. The control means 7 has a CPU or a DSP (Digital Signal Processor) as a high speed CPU.

The control means 7 in the case where it is constructed by a digital circuit has a construction similar to the foregoing output voltage determining means 6 and both of them can also be commonly used.

A method of measuring the operation voltage to obtain the maximum power in the control apparatus and method will now be described.

Figure 5:
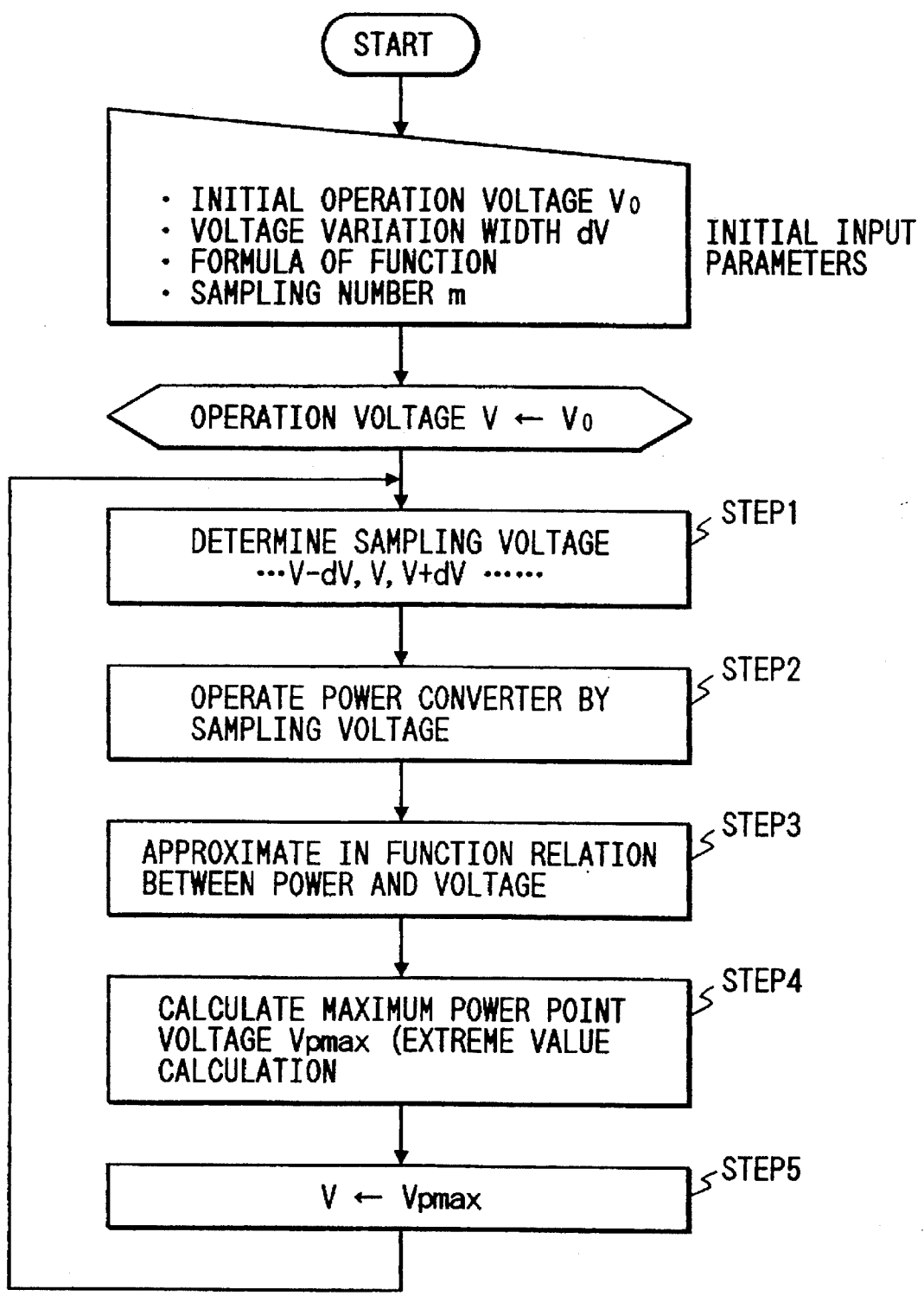
FIG. 5 is a flowchart showing the operation of the invention.

FIG. 5 is an operation flowchart of the present invention. When practicing the invention, it is first preferable to determine an initial operation voltage, a voltage fluctuation width by inspection, a function which is used for approximation, and the sampling numbers of the voltage and power and then store this information into a ROM. The initial operation voltage is determined by the construction of the solar battery array. For example, when ten solar battery modules UPM880 made by USSC Co., Ltd. are connected in series and used, the initial operation voltage is set to about 160V from the rated voltage shown in the operation manual. In any solar battery, since the rated voltage is displayed, it is sufficient to set the initial operation voltage in accordance with the rated voltage. The voltage fluctuation width is set to a value of approximately 10% or less of the initial operation voltage. In the invention, it is desirable to set the voltage fluctuation width to 2% or more. When the voltage fluctuation width is too small, the precision of the approximation function deteriorates due to the precision of the measuring instrument which can cause of an error in the optimum operation voltage. In the invention, even when a large fluctuation width is used, the tracking precision is higher than that of the conventional methods discussed.

The function that is used in the present invention must be a function having fluctuation points. Examples of such functions are polynomial functions of second or higher degree, a trigonometric functions, or the like. The sampling number must be set to a value at which the necessary parameters can be determined. For example, in the case of the quadratic function, three parameters are necessary to describe the function and at least three sampling points are necessary. A quadratic function is fairly suitable to realize in the invention because there is only one fluctuation point value and a solution can be easily obtained.

Trigonometric functions or exponential functions also can be described and solved by a relatively small number of parameters. However, an advantage of high order polynomial functions is that the fitting performance of a curve is high.

According to circumstances, after approximate values are first obtained by the quadratic function, the sampling operation can also be executed by another sampling method such as a tracking method mentioned above from positions near the approximate values.

The actual operation is executed as follows.
(First step)

(m) voltages to be are sampled are formed at positions near a present operation voltage V and are stored into the RAM of the voltage determining means 6.
(Second step)

The (m) voltages formed in the first step are supplied to the control means 7, thereby actually making the power converter operative. At the same time, voltage and current detection signals are input from the input/output ports. The voltage, current and the electric power values which were calculated by the numerical value operator are stored into the RAM.
(Third step)

On the basis of the voltage and power values obtained in the second step, the coefficients of the function which has previously been stored in the ROM are obtained. (Execution of the function approximation)
(Fourth step)

The voltage value at which the maximum power value is derived is obtained by using the function which was decided in the third step. This calculated voltage valve is the operation point voltage to obtain the maximum output voltage.

(Fifth step)

The optimum operation voltage obtained as mentioned above is supplied to the control means 7 of the power converter through the input/output port. The processing routine is returned to the first step.

According to the invention, the power converter is controlled while continuously inspecting the optimum operation point voltage as mentioned above.

Specific examples of the present invention will now be described hereinbelow in more detail.
[Embodiment 1]

Ten amorphous solar battery modules (made by USSC Co., Ltd.; a trade name UPM880) are serially connected and used as a solar battery. A full bridge inverter by an IGBT (Insulated Gate Bipolar Transistor) as a self-arc-extinguishing type switch device is constructed as a power converter 2. The IGBT is a switching device having a high voltage capacity and high speed switching. It is preferably used in inverters with a power range from a few 100 W to a few 10 kW.

An AC output of the power converter is set to 100V by using a transformer and is connected to the commercially available AC system as a load.

The voltage detecting means 4 is constructed in a manner such that the output voltage of the solar battery array is divided into 20:1 by a resistor and is converted into the digital value by using an A/D converter having a full scale value of 10V and a resolution of 12 bits. The digital value is sent to the voltage determining means 6 and control means 7 by using a parallel bus of eight bits. As current detecting means, a standard resistor of 10 milliohms is serially inserted into the solar battery array circuit and the voltage across the resultant serial circuit is amplified by 500 times using an operational amplifier. The amplified voltage is converted into the digital value of 12 bits by using an A/D converter similar to that in the voltage detecting means 4. The digital value is then sent to the voltage determining means 6 by a parallel bus of eight bits.

As a voltage determining means 6, a one-board microcomputer (8086 made by Intel Co., Ltd.) is used as a CPU. General parallel input/output ports, a memory, a numerical value operating coprocessor to execute a real number arithmetic operation, a serial interface, and the like are installed on the board. Such a CPU has a construction suitable for embodying the invention.

A PWM (pulse width modulation) of the well-known triangular wave comparing method is used as the control means 7. A carrier frequency is set to 2 kHz. The control means 7 of the invention compares a command voltage from the output voltage determining means 6 and the output voltage of the solar battery array and changes the duty cycle [ON time/(ON time+OFF time)] of the gate pulse so as to make the output voltage of the solar battery array coincide with the command voltage.

The measuring operation of the operation point of the embodiment will now be described.

If the solar battery array 1 is installed outdoors, the output of the output voltage determining means 6 is set to 150V. In this instance, the array output of the solar battery is equal to 150V, the current is equal to 0.87A, and the electric power is equal to 131W. The insolation amount is equal to about 75 mW/cm$^2$. It is possible to arbitrarily select those initial values in accordance with the input voltage range of the power converter, the array construction of the solar battery, and the kind of solar battery.

The output of the output voltage determining means 6 is subsequently changed at four points every 5V in a range from 145 to 160 V. The voltage, current, and power at those points are stored into a memory of the one-board microcomputer. The values in this case are shown in Table 1.

TABLE 1

| | Voltage (V) | Current (A) | Power (W) |
|---|---|---|---|
| 1 | 145 | 0.92 | 133 |
| 2 | 150 | 0.87 | 131 |
| 3 | 155 | 0.82 | 127 |
| 4 | 160 | 0.76 | 122 |

An electric power P is shown as a cubic expression of the voltage V. It is necessary to define the relational equations among the sampling number, power, and voltage beforehand, as mentioned above.

$$P = aV^3 + bV^2 + cV + d \quad (1)$$

By substituting the sets of voltage and power from Table 1 into equation (1), the following simultaneous equations are formed with four unknowns.

$$133 = 3048625a + 21025b + 145c + d$$

$$131 = 3375000a + 22500b + 150c + d$$

$$127 = 3723875a + 24025b + 155c + d$$

$$122 = 4096000a + 25600b + 160c + d$$

From the above equations, coefficients a, b, c, and d are determined as follows.

$a = 1.33684 \times 10^{-3}$ $b = -0.641615$ $c = 101.614$ $d = -5186.67$

The electric power V at which the electric power P becomes maximum is subsequently obtained by solving equation (1) as follows. Since such voltage V is equal to the voltage V of dp/dv=0, the following equation is derived.

$$V_{mp} = (-b \pm \sqrt{b^2 - 3ac})/3a \quad (2)$$

By substituting numerical values into the equation (2), the voltage at which the electric power P becomes maximum is obtained.

$V_{mp} = 143$ or $-176V$

Since the coefficient (a) of degree three is larger than 0 (a>0), the voltage at which the maximum value is derived is set to 143V.

The output voltage set value is determined as mentioned above and is sent to the control means 7.

In the next measurement, the voltage is changed at four points every 5V around the above voltage set value as a center and the measurement is again executed.

Figure 3:
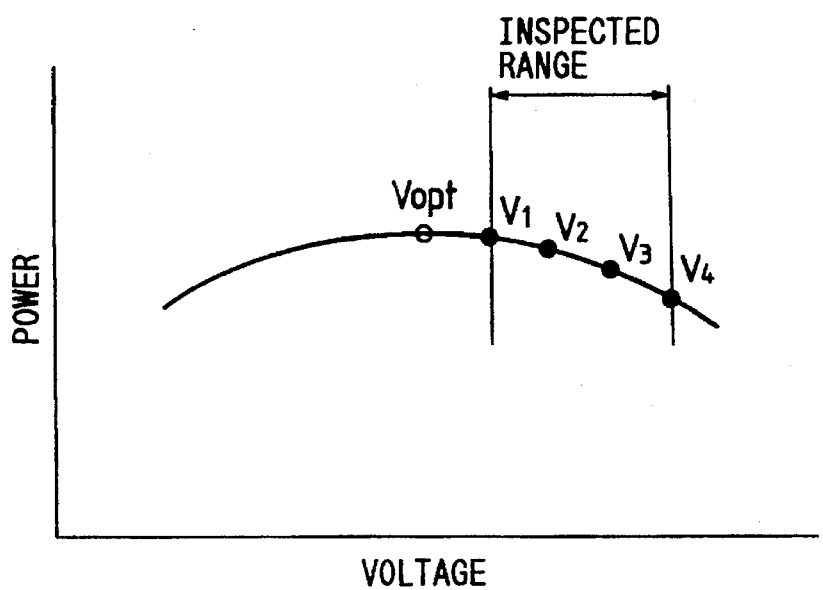
FIG. 3 is a graph showing an example of the inspection of the optimum operation point in the solar light power generation system using the control apparatus of the invention.

The optimum operation point voltage which was also measured by an I-V tracer prior to performing the example described above and found to be equal to about 142V. As shown, the invention determined the optimum operation point with a high precision. Moreover, even when the optimum operation point voltages exist out of the measured range, they can be immediately obtained. FIG. 3 shows such a state.

Further, even when the optimum operation point voltages are discretely inspected every 5V, the optimum operation voltage values can also be obtained in a manner similar to the case where they are continuously measured. In the embodiment, although the relational equation between the voltage and the power has been described by a cubic equation, a more complicated equation can also be used. In such a case, however, it is necessary to properly set a method of obtaining the voltage at which the maximum power value is derived, the number of parameters of the relational equation, a method of deciding such a number, and the like. The above calculations are performed by the microcomputer of the output voltage determining means 6 and the numerical value operating processor. The operation sequences and the relational equation between the voltage and the power must be previously stored as programs in the output voltage determining means 6.

In the embodiment, the tracking precision when the apparatus was continuously operated is equal to 99.96%.

However, when the measurements and calculations are performed using the same voltage fluctuation width value, as that in present embodiment, but using the method of JP-A-62-85312 in which the tracking precision is highest among the conventional methods, the tracking precision is only equal to 99.90%.

The tracking precision is a relative value of the output voltage amount in each method when the apparatus was continuously operated using an optimum operation point voltage set to 100.

[Embodiment 2]

Five amorphous solar batteries (made by USSC Co., Ltd.; trade name UPM880) are serially connected and used as a solar battery. A full bridge inverter by an MOSFET is constructed as a power converter 2. The MOSFET is a high speed switching device and is used in an inverter to convert a direct current of a relatively low voltage into an alternating current. The AC output of the power converter 2 is transformed into 100V by using a transformer and is connected to a commercially available AC system as a load.

The voltage detecting means divides the output voltage of the array into 10:1 by a resistor network and is converted into the digital value by using an A/D converter having a full scale of 10V and a resolution of 12 bits. The digital value is sent to the voltage determining means 6 and control means 7 by a parallel bus of eight bits. As a current detecting means, a standard resistor of 10 milliohms is serially inserted into the array circuit and the voltage across the resultant serial circuit is amplified by 500 times using an operational amplifier. The amplified signal is then converted into a digital value of 12 bits by using the same kind of A/D converter as the voltage detecting means. The digital value is then sent to the voltage determining means 6 by a parallel bus of eight bits.

As a voltage determining means 6, a one-board microcomputer using 68000 made by Motorola Inc. as a CPU is used. General parallel input/output ports, a memory, a numerical value operating coprocessor, a serial interface, and the like are installed on the board. Such a CPU is suitable to embody the present invention.

A PWM (pulse width modulation) of the well-known instantaneous value current comparing system is used as control means 7. A carrier frequency is set to about 8 kHz. The control means 7 of the invention compares the calculated voltage value from the voltage determining means 6 and the output voltage from the array and changes a duty of a gate pulse so as to make the array output voltage coincide with the calculated voltage value.

The measuring operation of the operation point in the embodiment will now be described.

The solar battery array 1 is installed outdoors. The output of the output voltage determining means 6 is set to 70V. In the array output of the solar battery in this instant, the voltage is equal to 70V, the current is equal to 0.95A, and the electric power is equal to 66.5W. The insolation amount at this time is equal to about 70 mW/cm$^2$.

The output of the output voltage determining means 6 is changed at three points (every 10V) in a range from 50 to 70 V. The voltage, current, and power at those points are stored into a memory of the one-board microcomputer. Table 2 shows the values in this instance.

TABLE 2

|   | Voltage (V) | Current (A) | Power (W) |
|---|---|---|---|
| 1 | 60 | 1.04 | 62.4 |
| 2 | 70 | 0.95 | 66.5 |
| 3 | 80 | 0.76 | 60.8 |

The electric power P is expressed as a quadratic equation of the voltage V. It is necessary to have previously defined the relational equations among the sampling number, the power, and the voltage.

$$P=aV^2+bV+c \quad (3)$$

By subsequently substituting the sets of voltage and power from table 2 into equation (3), the following simultaneous equations with three unknowns are obtained.

$$62.4=3600a+60b+c$$

$$66.5=4900a+70b+c$$

$$60.8=6400a+80b+c$$

The coefficients a, b, and c are calculated as follows by the above equations.

a=−0.049 b=6.78 c=−168

The voltage V at which the power P becomes maximum is obtained by solving equation (3) as follows. Since such a voltage is equal to the voltage V at which dp/dv=0, the following equation is derived.

$$V_{mp}=-b/2a \quad (4)$$

By substituting the numerical value into the equation (4), the voltage at which the maximum power value is derived is obtained.

$$V_{mp}=69V$$

As mentioned above, the output voltage set value is determined and sent to the control means 7.

In the next measurement, the voltage is changed at three points every 10V around the output voltage set value as a center and the measurement is again executed.

Figure 4:
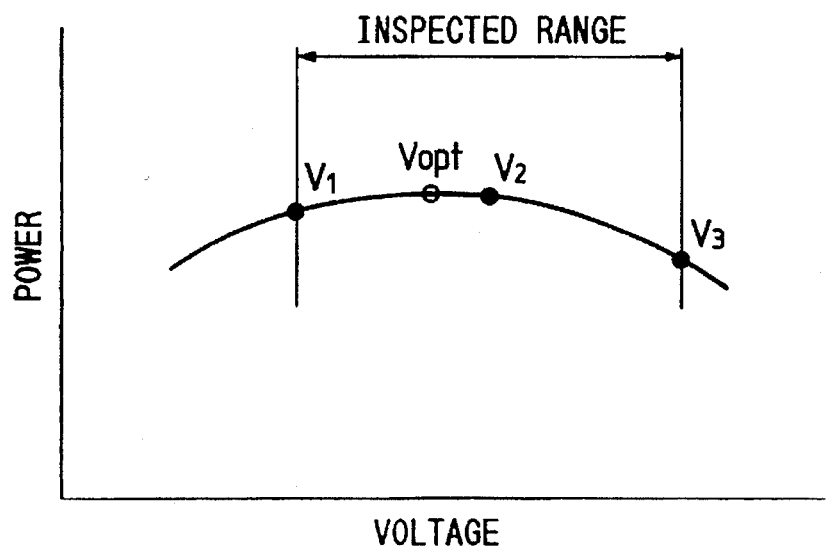
FIG. 4 is another example of the inspection of the optimum operation point of the solar light power generation system using the control apparatus of the invention.

The optimum operation point voltage was also determined to equal about 68V by measuring the output characteristics of the solar battery array. Thus, according to the method of the invention, in spite of the fact that the measurement is discretely performed in a very wide range, the optimum operation point can be accurately determined in a manner similar to the case where the voltage was continuously measured. FIG. 4 shows such a state.

In the embodiment, since the relational equation between the voltage and the power has been described by a quadratic equation, the coefficients of the relational equation and the voltage value which produces the maximum power value can be fairly easily calculated. Thus, the calculation time required by the voltage determining means 6 to perform its function can be reduced. Therefore, even with respect to a point of the operating speed, the embodiment is more advantageous as compared with embodiment 1.

When the apparatus is continuously operated in the embodiment, the tracking precision is equal to 99.0%. When the measurement is performed using the same voltage fluctuation width values as that in the present embodiment by the method of JP-A-62-85312, the tracking precision is equal only to 96.0%. As mentioned above, according to the invention, even in the case where the voltage fluctuation width for measurement is large, the optimum operation point can be traced at a high precision.

[Embodiment 3]

Twenty amorphous solar battery modules (made by USSC Co., Ltd.; trade name UPM880) are serially connected and used as a solar battery. An inverter for a motor by a power transistor is used as a power converter 2. The power converter has therein a gate control circuit. By inputting an analog voltage, an AC output voltage and frequency can be changed. An AC output of the power converter is connected to a pump for a well (3-phase 200V, 500 VA) as a load.

The voltage detecting means divides the output voltage of the array into 40:1 by a resistor. The divided voltage is converted into the digital value by using an A/D converter having a full scale of 10V and a resolution of 12 bits. The digital value is sent to the voltage determining means 6 by a parallel bus of eight bits. As a current detecting means, a standard resistor of 10 milliohms is serially inserted into the array circuit. The voltage across the resultant serial circuit is amplified by 500 times using an operational amplifier. The amplified signal is then converted into a digital value of 12 bits by using the same kind of A/D converter as that of the voltage detecting means. The digital value is then sent to the voltage determining means 6 by a parallel bus of eight bits.

As a voltage determining means 6, a one-board microcomputer using 68000 made by Motorola Inc. is used as a CPU. General parallel input/output ports, a memory, a numerical value operating coprocessor, a serial interface, a D/A converter, and the like are installed on the board. Such a CPU is suitable to embody the present invention.

In the embodiment, since a gate control circuit is built in the inverter, the output voltage determining means 6 has a function of the input voltage control. That is, an output frequency of the inverter for a motor is adjusted so that the input voltage is equal to the calculated value. The instructed frequency is sent as an analog voltage to the inverter for motor by using the D/A converter.

The measuring operation of the operation point in the embodiment will now be described.

The solar battery array is installed outdoors and the output of the output voltage determining means 6 is set to 280V. In the array output of the solar battery at this time, the voltage is equal to 280V, the current is equal to 1.15A, and the power is equal to 322W. The insolation amount is equal to 94 mW/cm$^2$.

Subsequently, the output of the output voltage determining means 6 is changed at three points every 20V in a range from 260 to 300 V. The voltage, current, and power at those points are stored into the memory of the one-board microcomputer. Table 3 shows the values at those times.

TABLE 3

| | Voltage (V) | Current (A) | Power (W) |
|---|---|---|---|
| 1 | 260 | 1.04 | 270 |
| 2 | 280 | 1.15 | 322 |
| 3 | 300 | 0.76 | 228 |

The power P is expressed as a quadratic function of the voltage V in a manner similar to embodiment 2.

$$P = aV^2 + bV + c \quad (5)$$

Subsequently, by substituting the sets of the voltages and powers from Table 3 into equation (5), the following simultaneous equations with three unknowns are obtained.

$$270 = 67600a + 260b + c$$

$$322 = 78400a + 280b + c$$

$$288 = 90000a + 300b + c$$

The coefficients a, b, and c are obtained are calculated as follows by the above equations.

a=−0.1825
b=101.15
c=−13692

The voltage V at which the power P becomes maximum is obtained from the equation (3). Since such a voltage is the voltage V in which dp/dv=0, the following equation is derived.

$$V_{mp} = -b/2a \quad (4)$$

By substituting the numerical values into equation (4), the voltage at which the maximum power value is derived is obtained.

$$V_{mp} = 277V$$

The output voltage set value is determined as mentioned above and is sent to the control means 7.

In the next measurement, the voltage is changed at three points every 20V around the above output voltage set value as a center and the inspection is again executed.

The optimum operation point voltage was also determined to be equal to about 276V by measuring the output characteristics of the array in the embodiment. According to the method of the invention, in spite of the fact that the measurement has been discretely performed in a very wide range, the optimum operation point can be determined in a manner similar to the case where the voltages were precisely and continuously measured.

As mentioned above, even when the present method is applied to an independent type power source, no problem occurs. The same shall also apply to the case where a DC/DC converter is used.

As described above, according to the invention, there are the following effects.

(1) Even when the optimum operation point is located out of the inspected region, the optimum operation point can be determined with high precision by one measurement.

(2) Even when the measurement is discretely performed by a predetermined step width, the optimum operation point can be determined in a manner similar to the case of continuously measuring.

(3) By setting the measurement step width to a large value, the optimum operation point can be accurately determined in a wide range by a small number of sampling points.

(4) Particularly, by using a quadratic function as a relational equation between the electric power and the voltage, the optimum operation point can be calculated at an extremely high speed.

According to the present invention having such excellent features, the industrial use value is very high. Particularly, it is very useful in a power generation system which is interconnected with the commercially available system.

What is claimed is:

1. A power control apparatus comprising:

power converting means for converting electric power from a battery power source and supplying the converted electric power to a load;

output value detecting means for detecting an output value of said battery power source;

output value determining means for determining an output set value of said battery power source; and control means for controlling said power converting means, such that the output value of said battery power source becomes the output set value of said output value determining means, wherein said control means and said output value determining means control said power converting means, such that: at a first step, the output set value of said output value determining means is a predetermined value and an operation voltage detected by said output value detecting means becomes the predetermined set value; at a second step, said output value determining means determines m-voltage set values which are calculated by adding to or subtracting from the operation voltage of the first step a predetermined segmental quantity, and the operation voltage detected per each of the m-voltage set values detected by said output value detecting means becomes the voltage set value per each of m-values; and at a third step, each of m-power values obtained based on m-current values measured correspondingly to each of the m-operation voltages at the second step, and each of the m-voltage values are introduced into a function formulated from a quadratic or cubic function of voltage and equations are derived therefrom to obtain a plurality of coefficients, further a differential function is derived from the function and the plurality of coefficients is introduced into the differential function to obtain a numerical value, and then the numerical value is used as the set value of said output value determining means, such that the operation voltage detected by said output value detecting means becomes the numerical value.

2. An apparatus according to claim 1, wherein said battery power source is a solar cell power source.

3. An apparatus according to claim 2, wherein said solar cell power source is used as the power source photovoltaic element having a non-monocrystalline semiconductor.

4. An apparatus according to claim 3, wherein said non-monocrystalline semiconductor is an amorphous silicon semiconductor.

5. An apparatus according to claim 3, wherein said solar cell battery power source is a power source mounted on a roof.

* * * * *

UNITED STATES PATENT AND TRADEMARK OFFICE
CERTIFICATE OF CORRECTION

PATENT NO. : 5,654,883
DATED : August 5, 1997
INVENTOR(S) : NOBUYOSHI TAKEHARA ET AL.

It is certified that error appears in the above-identified patent and that said Letters Patent is hereby corrected as shown below:

SHEET 3, FIGURE 5
"CALCULATION" should read --CALCULATION)--.

COLUMN 1
Line 21, "result" should read --result,--;
Line 32, "method" should read --method,-- (both occurrences);
Line 38, "method" should read --method,-- (both occurrences);
Line 61, "Some" should read --some--.

COLUMN 2
Line 34, "above described" should read --above-described--;
Line 58, "valve" should read --value--.

COLUMN 3
Line 11, "(m) powers" should read --(m) power values--;
Line 66, "(so called" should read --(so-called--.

COLUMN 5
Line 19, "of" should be deleted;
Line 26, "a" should be deleted;
Line 66, "valve" should read --value--.

COLUMN 7
Line 15, "before" should read --before---;
Line 36, "electric power V" should read --electric voltage V--;

UNITED STATES PATENT AND TRADEMARK OFFICE
CERTIFICATE OF CORRECTION

PATENT NO. : 5,654,883
DATED : August 5, 1997
INVENTOR(S) : NOBUYOSHI TAKEHARA ET AL.

It is certified that error appears in the above-identified patent and that said Letters Patent is hereby corrected as shown below:

<u>COLUMN 8</u>
  Line 18, "present" should read --the present--.

<u>COLUMN 9</u>
  Line 1, "instant," should read --instance,--;
  Line 25, "table 2" should read --Table 2--.

<u>COLUMN 11</u>
  Line 22, "are" (first occurrence) should be deleted.

Signed and Sealed this

Twenty-sixth Day of May, 1998

*Attest:*

BRUCE LEHMAN

*Attesting Officer*         *Commissioner of Patents and Trademarks*